(12) United States Patent
Lin et al.

(10) Patent No.: US 12,099,011 B2
(45) Date of Patent: Sep. 24, 2024

(54) METHOD FOR CALIBRATING FLUORESCENT PLATE READERS

(71) Applicant: PLEXBIO CO., LTD., Taipei (TW)

(72) Inventors: Cheng-Tse Lin, Taipei (TW); Yi-Ming Sun, San Jose (TW); Kuei-Shen Hsu, Taipei (TW); Liang-Han Chang, Taipei (TW); Yao-Kuang Chung, Taipei (TW); Chin-Yun Wu, Taipei (TW); Chin-Shiou Huang, Taipei (TW)

(73) Assignee: PLEXBIO CO., LTD., Taipei (TW)

( * ) Notice: Subject to any disclaimer, the term of this patent is extended or adjusted under 35 U.S.C. 154(b) by 362 days.

(21) Appl. No.: 17/083,182

(22) Filed: Oct. 28, 2020

(65) Prior Publication Data

US 2021/0041362 A1 Feb. 11, 2021

Related U.S. Application Data

(62) Division of application No. 15/470,355, filed on Mar. 27, 2017, now abandoned.

(60) Provisional application No. 62/316,055, filed on Mar. 31, 2016.

(51) Int. Cl.
| | | |
|---|---|---|
| G01N 21/64 | (2006.01) |
| B01L 3/00 | (2006.01) |
| C08F 20/18 | (2006.01) |
| C08F 120/14 | (2006.01) |
| C08K 5/357 | (2006.01) |
| C09B 69/10 | (2006.01) |
| C09K 11/02 | (2006.01) |
| C09K 11/06 | (2006.01) |
| G01N 21/27 | (2006.01) |
| G01N 21/93 | (2006.01) |

(52) U.S. Cl.
CPC ........ *G01N 21/6452* (2013.01); *B01L 3/5085* (2013.01); *C08F 20/18* (2013.01); *C08F 120/14* (2013.01); *C08K 5/357* (2013.01); *C09B 69/101* (2013.01); *C09B 69/103* (2013.01); *C09B 69/105* (2013.01); *C09B 69/109* (2013.01); *C09K 11/02* (2013.01); *C09K 11/06* (2013.01); *G01N 21/278* (2013.01); *G01N 21/6486* (2013.01); *B01L 2200/12* (2013.01); *B01L 2200/148* (2013.01); *B01L 2300/0829* (2013.01); *C09K 2211/1033* (2013.01); *G01N 2201/127* (2013.01)

(58) Field of Classification Search
None
See application file for complete search history.

(56) References Cited

U.S. PATENT DOCUMENTS

| | | | | |
|---|---|---|---|---|
| 2,084,399 | A * | 6/1937 | Kuettel | C08F 265/06 526/329.7 |
| 6,471,916 | B1 * | 10/2002 | Noblett | G01N 21/274 250/252.1 |
| 6,794,424 | B2 * | 9/2004 | Holcomb | G01N 21/278 523/137 |

(Continued)

*Primary Examiner* — Neil N Turk
(74) *Attorney, Agent, or Firm* — WPAT, P.C

(57) ABSTRACT

The present invention relates to a fluorescent polymer cast on the surface of wells of a plate and a plate comprising the fluorescent polymer. The plate is used in a method for calibrating read-out values of plate readers. The method for calibrating the plate readers can effectively reduce the deviation of read-out values among different plate readers.

5 Claims, 3 Drawing Sheets

(56) References Cited

U.S. PATENT DOCUMENTS

| | | | |
|---|---|---|---|
| 7,480,042 B1* | 1/2009 | Phillips | G01N 21/76 |
| | | | 356/243.1 |
| 2003/0107738 A1* | 6/2003 | Curtis | G01N 21/274 |
| | | | 356/627 |
| 2003/0204410 A1* | 10/2003 | Agarwal | G01J 3/524 |
| | | | 382/162 |
| 2004/0036868 A1* | 2/2004 | Jones | G01N 21/278 |
| | | | 356/243.1 |
| 2006/0024831 A1* | 2/2006 | Kao | B01L 3/563 |
| | | | 356/243.1 |
| 2010/0062429 A1* | 3/2010 | Patton | C07F 9/5304 |
| | | | 435/6.1 |
| 2011/0318226 A1* | 12/2011 | Ge | G01N 21/278 |
| | | | 422/63 |
| 2017/0212050 A1* | 7/2017 | Hensley | B01L 3/545 |

* cited by examiner

METHOD FOR CALIBRATING FLUORESCENT PLATE READERS

FIELD OF THE INVENTION

The present invention relates to a plate and a kit for calibrating fluorescence intensity and a calibration application using the kit. More particularly, the present invention relates to a plate having a fluorescent polymer cast on the wells of the plate and the application of the plate in calibrating fluorescence intensity.

BACKGROUND OF THE INVENTION

Fluorescence plate readers have been widely used in various applications, for example, in the field of in vitro diagnostic. Fluorescence plate readers generally comprise a light source for excitation, a filter for selecting specific wavelength and a detector. However, different plate readers may have different factory specifications. The light source for excitation (such as a mercury lamp or a light emitting diode) of the plate readers with the same model may even result in different degrees of light decline over the time. As a result, there is a need for calibrating plate reader(s) so as to provide reliable and comparable results from different plate readers. There are various methods for calibrating plate readers by using standards. The important concept of these standards is that they should not vary significantly from test-to-test, from day-to-day or from laboratory-to-laboratory.

U.S. Pat. No. 6,348,965 discloses a solid state standard for spectroscopic readers comprising a microplate to orient the solid state standard; and an optical glass probe, coated with fluorescent dye with an energy state that can be excited by an external source and which is shaped to fit into said microplate.

US 2002/0048817 discloses a standard for calibrating an instrument, such as a spectrometer, a multi-well plate reader, or an imager, comprising one or more viscosity changing polymers (which exist in a fluid (e.g., liquid) or a viscous material (e.g., gel)) and at least one dye.

U.S. Pat. No. 7,072,036 B2 discloses a method of producing a multi-modality fluorescence reference plate comprising the steps of: i) ink jet printing or screen-printing a fluorogenic compound onto a first surface of a base sheet such as a printing paper or card; and ii) affixing said base sheet to a first surface of a plate comprising one or more wells to provide a seal there between.

Fluorescent dye is a fluorescent chemical compound that can re-emit light upon light excitation. The fluorescent dye typically contains several combined aromatic groups, or plane or cyclic molecules with several π bonds. The fluorescent dye can be used in a variety of analytical methods, i.e., fluorescent imaging and spectroscopy. However, many known fluorescent dyes are significantly quenched in aqueous solution or are unstable during the illumination. Fluorescent polymer is a polymer that displays fluorescent properties, including oligomers such as dimers, trimers etc. and copolymers. The fluorescent polymers are often used for various labeling and detection methods, and in imaging, in particular by fluorescence microscopy and confocal microscopy.

U.S. Pat. No. 5,897,811 A discloses a method of preparing a fluorescent polymer, whereby an ethylenically unsaturated monomer is copolymerized with a polynuclear aromatic hydrocarbon or a substituted aromatic derivative thereof, such that the resultant polymer is fluorescent.

U.S. Pat. No. 5,043,406 A discloses that a fluorescent polymer comprising acrylamide monomer and fluorescent groups such as N-dibenzosuberenylacrylamide (N-5-(5H-dibenzo[a,d]cycloheptenyl)acrylamide can be prepared. Fluorescent acrylamide and non-acrylamide base polymers can readily be prepared by copolymerization with the fluorescent acrylamide monomers.

However, there is still a need for developing a method for calibrating plate readers so as to decrease the deviation of read-out values from different plate readers.

SUMMARY OF THE INVENTION

The present invention relates to a fluorescent polymer cast on the wells of a plate and the plate containing the fluorescent polymer. The plate is used in a method for calibrating read-out values of plate readers.

One aspect of the invention is to provide a fluorescent polymer comprising a pre-determined amount of a fluorescent dye imbedded in a polymer, wherein the fluorescent polymer is transparent, dry and solvent- and porogen-free.

Another aspect of the invention is to provide a plate comprising a fluorescent polymer of the invention which is casted on the wells of the plate, wherein the fluorescent polymer is transparent, dry and solvent- and porogen-free. In a preferred embodiment of the invention, the amounts of the fluorescent dye imbedded in the fluorescent polymer on wells of the microplate are present as a concentration gradient.

In a preferred embodiment of the invention, the fluorescent dye is selected from the group consisting of Alexa Fluor, 7-Aminoactinomycin D, 8-Anilinonaphthalene-1-sulfonic acid, ATTO dyes, Auramine-rhodamine stain, Benzanthrone, Bimane, 9,10-Bis(phenylethynyl)anthracene, 5,12-Bis(phenylethynyl)naphthacene, Bisbenzimide, Blacklight paint, Brainbow, Calcein, Carboxyfluorescein, Carboxyfluorescein diacetate succinimidyl ester, Carboxyfluorescein succinimidyl ester, 1-Chloro-9,10-bis(phenylethynyl)anthracene, 2-Chloro-9,10-bis(phenylethynyl)anthracene, 2-Chloro-9,10-diphenylanthracene, Coumarin, DAPI, Dark quencher, DiOC6, DyLight Fluor, Epicoccone, FlAsH-EDT2, Fluo-3, Fluo-4, FluoProbes, Fluorescence image-guided surgery, Fluoro-Jade stain, FMN-binding fluorescent proteins, Fura-2, Fura-2-acetoxymethyl ester, Green fluorescent protein (GFP), Heptamethine dyes, Hoechst stain, Iminocoumarin, Indian yellow, Indo-1, Laurdan, Lucifer yellow, Luciferin, MCherry, Merocyanine, Nile red, Optical brightener, Perylene, Phloxine, Phycobilin, Phycoerythrin, Phycoerythrobilin, Pyranine, Rhodamine, Rhodamine 123, Rhodamine 6G, RiboGreen, RoGFP, Rubrene, (E)-Stilbene, (Z)-Stilbene, Sulforhodamine 101, Sulforhodamine B, SYBR Green I, SYBR Safe, Synapto-pHluorin, Tetraphenyl butadiene, Tetrasodium tris(bathophenanthroline disulfonate)ruthenium(II), Texas Red, Titan yellow, TSQ, Umbelliferone, Violanthrone, Yellow fluorescent protein and YOYO-1.

In a preferred embodiment of the invention, the fluorescent polymer comprises a polymer selected from the group consisting of styrene-butadiene copolymer, acrylonitrile-styrene copolymer (SAN), general purpose polystyrenre (GPPS) such as high impact polystyrene (HIPS), acrylonitrile-styrene copolymer (AS resin), acrylonitrile-butadiene-styrene copolymer (ABS resin), polymethyl methacrylate (PMMA), polycarbonate (PC), polyethylene (PE), polyvinyl butyral (PVB) and polylactic acid (PLA) and styrene ethylene/butylene styrene copolymer (SEBS).

Another aspect is to provide a method of producing a fluorescent polymer comprising: mixing a monomer and a pre-determined amount of fluorescent dye; and forming the fluorescent polymer by polymerizing the monomer with a polymerization initiator, wherein the fluorescent polymer is transparent, dry and solvent- and porogen-free; provided that no liquid solvent is added in the method.

The invention provides a method of producing a fluorescent polymer plate, comprising: (a) mixing a monomer solution and a pre-determined amount of fluorescent dye; (b) adding the resulting mixture of (a) to wells of the plate; and polymerizing the monomer with a polymerization initiator on the wells, wherein the fluorescent polymer is transparent, dry and solvent- and porogen-free; provided that no liquid solvent is added in the method.

In a preferred embodiment of the invention, the monomer is liquid at room temperature. In a preferred embodiment of the invention, the initiator is selected from the group consisting of a free radical initiator, a cationic initiator, or an anionic initiator. In a preferred embodiment of the invention, the free radical initiator is peroxide or an azo compound. In a preferred embodiment of the invention, the monomer is selected from the group consisting of styrene, acrylonitrile, methyl methacrylate (MMA), butyraldehyde and lactic acid.

The present invention also provides a method of providing a standard curve for quantifying a biomolecule comprising: providing the preceding plate; obtaining a set of values of fluorescence from the plate reader; and drawing the standard curve of best fit based on the set of values of fluorescence and a linear regression analysis.

The present invention also provides a method for calibrating a vendor plate reader, comprising: providing a plate reader calibrated by a certified reference material (CRM); placing the plate of the invention in the plate reader to calibrate the plate reader; obtaining a set of original values from the plate readers; and recording the set of values in a software.

The present invention also provides a method for calibrating read-out values of a user plate reader, comprising providing the plate and software of the invention as described herein; placing the plate in a plate reader; obtaining a set of read-out values from the plate reader; calibrating the set of read-out values based on the software and a linear regression anylasis.

The present invention also provides a method for calibrating read-out values of plate readers comprising: providing a master plate reader calibrated by a certified reference material (CRM); placing the preceding plate in the master plate reader; and obtaining a first set of read-out values of fluorescence from the master plate reader.

In a preferred embodiment of the invention, the preceding method further comprises: placing the preceding plate in a second plate reader; obtaining a second set of read-out values of fluorescence from the second plate reader; obtaining a linear regression formula based on the first set of read-out values and the second set of read-out values; and calibrating the second set of read-out values based on the linear regression formula.

In a preferred embodiment of the invention, the CRM is standard reference material (SRM). In a preferred embodiment of the invention, the linear regression anaylsis is a Weighted Least Squares (WLS) method.

Another aspect of the invention is to provide a kit comprising the plate of the invention, and a protocol for using the kit to calibrate a plate reader.

The present invention is described in detail in the following sections. Other characterizations, purposes and advantages of the present invention can be easily found in the detailed descriptions and claims of the invention.

DETAILED DESCRIPTION OF THE INVENTION

Figure 1:
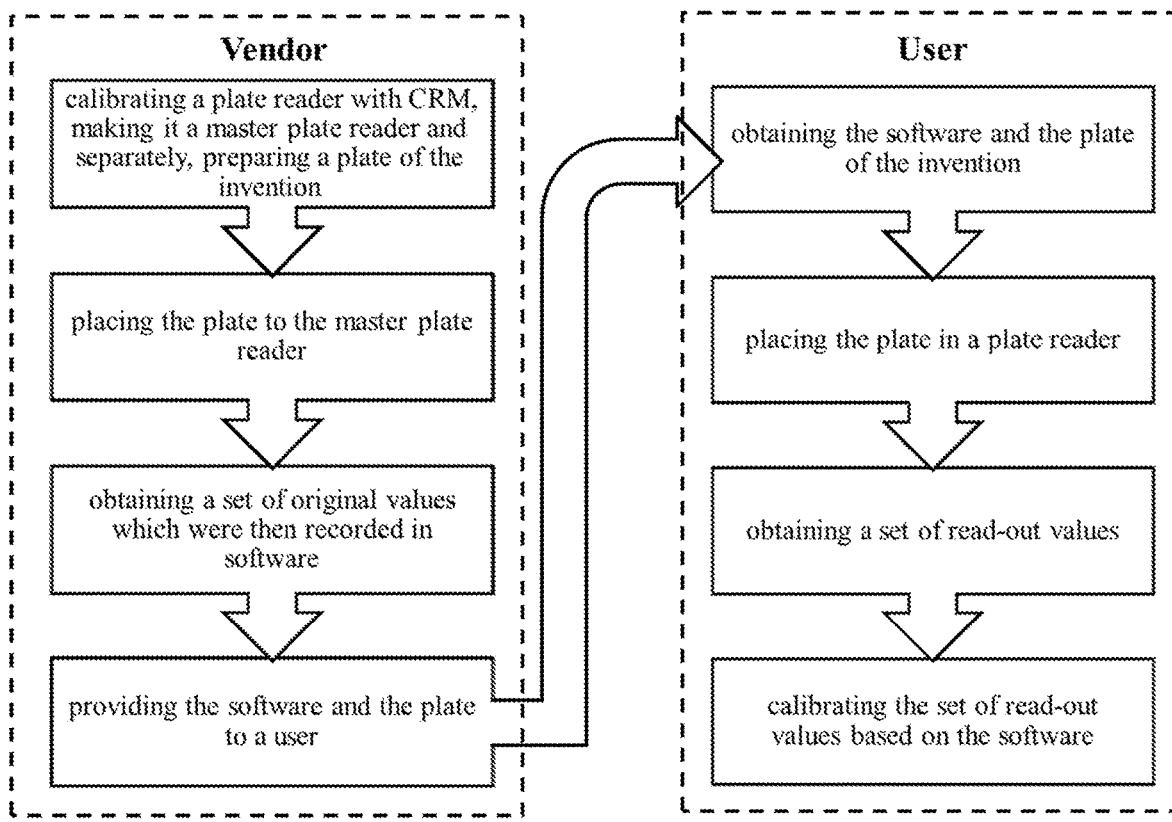
FIG. 1 shows the flow chart for a vendor to provide a user with software and the plate of the invention for the calibration of plate readers.

The present invention relates to a fluorescent polymer cast on the wells of a plate and a method for preparing the same. The plate can be used to calibrate read-out values of plate readers.

Definitions

Unless otherwise defined herein, scientific and technical terms used in connection with the present invention shall have the meanings that are commonly understood by those of ordinary skill in the art. The meaning and scope of the terms should be clear; however, in the event of any latent ambiguity, definitions provided herein take precedence over any dictionary or extrinsic definition.

Unless otherwise required by context, singular terms shall include the plural and plural terms shall include the singular. For example, the terms "a" or "an," as used herein, are defined as one or more than one.

As used herein, the term "fluorescent polymer" refers to a polymer that displays fluorescent properties, including oligomers such as dimers, trimers etc. and copolymers.

As used herein, the term "fluorescent dye" refers to a dye which absorbs light at a first wavelength and emits at second wavelength which is longer than the first wavelength.

As used herein, the term "fluorescence" refers to the emission of light by a substance that has absorbed light or other electromagnetic radiation. In most cases, the emitted light has a longer wavelength, and therefore lower energy, than the absorbed radiation.

As used herein, the term "porogen" refers to a pore forming material dispersed in a material that is subsequently removed to yield pores, voids or free volume in the material.

As used herein, the term "monomer" refers to varying molecular weight compounds (i.e. typically having number average molecular weights from about 300 to about 100,000) that can be polymerized.

As used herein, the term "room temperature" refers to an indoor ambient air temperature of from about 15° C. (60° F.) to about 33° C. (90° F.).

As used herein, the term "liquid solvent" refers to a liquid capable of dissolving another substance. The liquid monomer according to the present invention shall not be deemed as a liquid solvent.

As used herein, the term "polymer" refers to a molecule of high relative molecular mass, the structure of which essentially comprises the multiple repetitions of units derived, actually or conceptually, from molecules of low relative molecular mass.

As used herein, the term "initiator" refers to a source of any chemical species that reacts with a monomer (single molecule that can form chemical bonds) to form an intermediate compound capable of linking successively with a large number of other monomers into a polymer.

As used herein, the term "plate" or "microplate" also refers to "microtiter plate," "microwell plate" or "multiwell." A microplate typically has 6, 12, 24, 48, 96, 384 or more sample wells arranged in a rectangular matrix.

As used herein, the term "plate reader" refers to an instrument designed to measure fluorescence, typically comprising a light source, filters and detectors.

As used herein, the term "MFI" refers to the mean or median fluorescence intensity of a population of fluorescence particles. It will be understood that other statistical measures of the population fluorescence, such as truncated mean or truncated median fluorescence, may be used.

As used herein, the term "kit" refers to an assembly of manuals, protocols, useful compounds, plate and/or plate readers. A kit therefore may include one or more devices, plates and/or compounds of the present invention.

As used herein, the term "linear regression analysis" is defined as the fitting of a model such as a line or plane through a given set of points according to a specified goodness-of-fit criterion to yield the parameters of an appropriate linear function. The analysis requires a minimum of two data points and may be conducted by a linear least squares method, or any other suitable method that minimizes the discrepancies between the data and the model used to fit the data.

As used herein the term "standard curve" refers to a plot of biomolecule quantification against a measured parameter of an assay. The standard curve may be prepared by determining the measured parameter of biomolecule standards of known amount, plotting the measured value against on a two-dimensional axis of measured value against amount of a biomolecule. The curve may then be drawn by interpolating between the points or by drawing a line of best fit. It is preferred that said standard curve is linear.

As used herein the term "quantification" refers to measurement of a quantity, for example but not limited to measurement of the amount of biomolecule within a sample.

As used herein, the term "biomolecule" refers to any compound isolated from a living organism, as well as analogs (including engineered and/or synthetic analogs), derivatives, mutants or variants and/or biologically active fragments of the same. For example, the biomolecule can be a protein, nucleic acid, nucleotide, carbohydrate or lipid.

As used herein, the term "coefficient of variation (CV)" refers to a ratio of the standard deviation σ to the mean $$\mu \left( CV = \frac{\sigma}{\mu} \right).$$

The CV shows the extent of variability in relation to the mean of the population.

As used herein, the term "serial dilution" refers to any form of dilution necessary to prepare a standard curve covering a range of concentrations (i.e. concentration gradient) of a substance (e.g. DNA, RNA, protein, etc.) from which the amount of a "target substance" can be quantified. The dilution factor includes not is not limited to 1:2, 1:4, 1:5, 1:10, etc. The concentration gradient includes but is not limited to 3, 4, 5, 6, 7, 8, 9, 10, 11, 12 concentrations.

As used herein, the term "Certified Reference Materials (CRMs)" refers to "controls" or "standards" used to check the quality and metrological traceability of products, to validate analytical measurement methods, or for the calibration of instruments such as a plate reader. CRMs must by definition be traceable to an accurate realization of the unit in which the property values are expressed. Each property value must be accompanied by an uncertainty at a stated level of confidence. The United States National Institute of Standards and Technology (NIST) use the trade marked term "Standard Reference Material (SRM)" to denote a CRM that satisfies additional NIST-specific criteria. The information of SRM is available on the website of NIST (http://www.nist.gov/). SRM is intended for use in the evaluation and calibration of the relative spectral responsivity of steady-state fluorescence spectrometers with a continuous excitation source and for determining the day-to-day or instrument-to-instrument intensity variations of a single or similar fluorescence instrument(s), respectively.

As used herein, the term "certified value" according to NIST-specific criteria refers to a value for which NIST has the highest confidence in its accuracy in that all known or suspected sources of bias have been investigated or taken into account. The certified values for E and corresponding total uncertainties at the 95% confidence level, $U_{95}$, at each emission wavelength are given in the manual of SRM.

As used herein, the term "vendor" refers to the supplier of retail products, such as the kit for the calibration of plate reader(s).

As used herein, the term "user" includes any user, customer, members of an organization, constituents, or anyone who uses the calibration method of the invention. The user may refer to an "end user", a person who ultimately uses or is intended to ultimately use the calibration method of the invention.

As used herein, the term "software" refers to executable instructions, code, data, applications, programs, or the like maintained in or on any form of computer-readable media.

Fluorescent Polymer and Plate Comprising the Fluorescent Polymer

In one aspect, the invention provides a fluorescent polymer comprising a pre-determined amount of a fluorescent dye imbedded in a polymer, wherein the fluorescent polymer is transparent, dry and solvent- and porogen-free.

In another aspect, the invention provides a plate comprising a fluorescent polymer of the invention which is casted on the wells of the plate, wherein the fluorescent polymer is transparent, dry and solvent- and porogen-free. In an embodiment, the plate is a microplate. In some further embodiments, the microplate has 6, 12, 24, 48, 96, 384 or more wells.

In an embodiment of the invention, the fluorescent polymer is a polymer comprising a fluorescent dye imbedded therein and such fluorescent polymer is transparent, dry and solvent- and porogen-free. In a preferred embodiment of the invention, the amounts of the fluorescent dye imbedded in the fluorescent polymer on wells of the plate are present as a concentration gradient.

In some embodiments, the fluorescent dye used in the invention includes, but is not limited to Alexa Fluor, 7-Aminoactinomycin D, 8-Anilinonaphthalene-1-sulfonic acid, ATTO dyes, Auramine-rhodamine stain, Benzanthrone, Bimane, 9,10-Bis(phenylethynyl)anthracene, 5,12-Bis(phenylethynyl)naphthacene, Bisbenzimide, Blacklight paint, Brainbow, Calcein, Carboxyfluorescein, Carboxyfluorescein diacetate succinimidyl ester, Carboxyfluorescein succinimidyl ester, 1-Chloro-9,10-bis(phenylethynyl)anthracene, 2-Chloro-9,10-bis(phenylethynyl)anthracene, 2-Chloro-9, 10-diphenylanthracene, Coumarin, DAPI, Dark quencher, DiOC6, DyLight Fluor, Epicocconone, FlAsH-EDT2, Fluo-3, Fluo-4, FluoProbes, Fluorescence image-guided surgery, Fluoro-Jade stain, FMN-binding fluorescent proteins, Fura-2, Fura-2-acetoxymethyl ester, Green fluorescent protein (GFP), Heptamethine dyes, Hoechst stain, Iminocoumarin, Indian yellow, Indo-1, Laurdan, Lucifer yellow, Luciferin, MCherry, Merocyanine, Nile red, Optical brightener, Perylene, Phloxine, Phycobilin, Phycoerythrin, Phycoerythrobilin, Pyranine, Rhodamine, Rhodamine 123, Rhodamine 6G, RiboGreen, RoGFP, Rubrene, (E)-Stilbene, (Z)-Stilbene, Sulforhodamine 101, Sulforhodamine B, SYBR Green I, SYBR Safe, Synapto-pHluorin, Tetraphenyl butadiene, Tetrasodium tris(bathophenanthroline disulfonate)ruthenium(II), Texas Red, Titan yellow, TSQ, Umbelliferone, Violanthrone, Yellow fluorescent protein and YOYO-1. In a further embodiment, the fluorescent dye is Nile red.

In an embodiment of the invention, the polymer is transparent in appearance. In some embodiments, the polymer includes, but is not limited to styrene-butadiene copolymer, acrylonitrile-styrene copolymer (SAN), general purpose polystyrenre (GPPS) such as high impact polystyrene (HIPS), acrylonitrile-styrene copolymer (AS resin), acrylonitrile-butadiene-styrene copolymer (ABS resin), polymethyl methacrylate (PMMA), polycarbonate (PC), polyethylene (PE), polyvinyl butyral (PVB) and polylactic acid (PLA) and styrene ethylene/butylene styrene copolymer (SEBS). Preferably, the polymer is PMMA.

The polymer is formed from the monomer of the above-mentioned polymer. In a preferred embodiment of the invention, the monomer is liquid at room temperature. In a preferred embodiment of the invention, the monomer is selected from the group consisting of styrene, acrylonitrile, methyl methacrylate (MMA), butyraldehyde and lactic acid.

Methods for Preparing the Fluorescent Polymer and Plate of the Invention

In another aspect, the invention provides a method of producing a fluorescent polymer comprising: mixing a monomer and a pre-determined amount of fluorescent dye; and forming the fluorescent polymer by polymerizing the monomer with a polymerization initiator, wherein the fluorescent polymer is transparent, dry and solvent- and porogen-free; provided that no liquid solvent is added in the method.

In some embodiments, the initiator is a free radical initiator, a cationic initiator, or an anionic initiator. Preferably, the initiator is free radical initiator such as peroxide and azo compound. In some embodiments, the "peroxide" includes, but is not limited to acyl peroxides such as acetyl and benzoyl peroxides, alkyl peroxides such as cumyl and t-butyl peroxides, hydroperoxides such as t-butyl and cumyl hydroperoxides and peresters such as t-butyl perbenzoate. Other peroxides used to initiate polymerization are acyl alkylsulfonyl peroxides, dialkyl peroxydicarbonates, diperoxyketals, and ketone peroxides. In another some embodiments, the "azo compound" includes, but is not limited to 2,2'-Azobisisobutyronitrile (AIBN), 2,2'-azobis(2,4-dimethylpentanenitrile), 4,4'-azobis(4-cyanovaleric acid), and 1,1'-azobis(cylohexanecarbonitrile). In some embodiments, the monomers are those described above.

The pre-determined amount of fluorescent dye is dissolved in a liquid monomer. Preferably, the resulting solution performs a serial dilution. Then, the initiator is added to the solution to initiate polymerization reaction to form a polymer. Using the method, the fluorescent dye is imbedded in the polymer so that the polymer emits fluorescence when shined with light with a proper wavelength (excitation wavelength). No solvent is used to dissolve the mixture of fluorescent dye, polymerization initiator and the monomer. Since there is no solvent added, the resulting polymer is porogen-free and contains no liquid inside it. The dry environment inside the polymer helps to stabilize the fluorescent dye.

In a further embodiment, the fluorescence polymer can be in situ prepared in the wells of the plate. Accordingly, the invention provides a method of producing a fluorescent polymer plate, comprising: (a) mixing a monomer solution and a pre-determined amount of fluorescent dye; (b) adding the resulting mixture of (a) to wells of the plate; and polymerizing the monomer with a polymerization initiator on the wells, wherein the fluorescent polymer is transparent, dry and solvent- and porogen-free; provided that no liquid solvent is added in the method.

Since there is no solvent, the polymer is porogen-free and contains no liquid inside. The fluorescence dye can maintain stable in the dry environment inside the polymer.

The plate of the invention can be used to provide a standard curve for quantifying a biomolecule. The use of the plate can obtain a set of values of fluorescence from a plate reader. Subsequently, the standard curve of best fit can be obtained based on the set of values of fluorescence and a linear regression analysis.

Applications

The invention provides a method for calibrating a vendor plate reader, comprising: providing a plate reader calibrated by a certified reference material (CRM); placing the plate of the invention in the plate reader to calibrate the plate reader; obtaining a set of original values from the plate readers; and recording the set of values in a software (see FIG. 1 (left half)). In a preferred embodiment of the invention, the method includes a step of executing a linear regression anylasis. In a preferred embodiment of the invention, the linear regression is a Weighted Least Squares (WLS) method. In a preferred embodiment of the invention, the method is conduted by a vendor.

The present invention also provides a method for calibrating read-out values of a user plate reader, comprising: providing the plate and software of the invention as described in paragraph [0068]; placing the plate in a plate reader; obtaining a set of read-out values from the plate reader; calibrating the set of read-out values based on the software and a linear regression anylasis (see FIG. 1 (right half)).

The present invention also provides a method for calibrating read-out values of plate readers comprising: providing a master plate reader calibrated by a certified reference material (CRM); placing the preceding plate in the master plate reader; and obtaining a first set of read-out values from the master plate reader. Preferably, the master plate reader is a vendor plate reader.

In a preferred embodiment of the invention, the preceding method further comprises: placing the preceding plate in a second plate reader; obtaining a second set of read-out values of fluorescence from the second plate reader; obtaining a linear regression formula based on the first set of read-out values and the second set of read-out values; and calibrating the second set of read-out values based on the linear regression formula. Preferably, the second plate reader is a user plate reader.

In an embodiment of the invention, the CRM is standard reference material (SRM). In a preferred embodiment of the invention, the linear regression anaylsis is a Weighted Least Squares (WLS) method.

The method for calibrating the plate readers can effectively reduce CV % of read-out values among different plate readers. After the calibration, read-out values from different plate readers have a CV % less than 5%, preferably less than 4%, preferably less than 2% and more preferably less than 1%.

The invention also provides a kit comprising the plate of the invention, and a protocol for using the kit to calibrate a plate reader.

Having now generally described the invention, the same may be more readily understood through reference to the following examples, which provide exemplary protocols for the production of the pharmaceutical composition of the invention and their use in the enhancement of the treatment of acute stroke. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Example 1: Preparation of a Fluorescent Polymer

A fluorescent monomer mixture is prepared according to following steps: dissolving 0.1 mg Nile Red in 1 ml methyl methacrylate (MMA) (hereafter "Solution 1"); dissolving AlBN in MMA; performing a serial dilution of Solution 1 with MMA (hereafter "Solution 3"); adding the AlBN solution to Solutions 3 to a concentration of 0.005% (hereafter "Solution 4"); adding 50 µl of each concentrations of Solution 4 to the wells of a microplate; and incubating the microplate at 37° C. for 24 hrs for polymerizing the monomer.

The resultant fluorescent polymer is transparent, dry and porogen-free on the surface of wells of the microplate. The fluorescent dye imbedded in the polymers is present as a concentration gradient (8 concentrations) and is very stable. A significant aspect of resulting fluorescent polymer is that no liquid solvent is used to dissolve the mixture of fluorescent dye, polymerization initiator and the monomers. In other words, before the polymerization reaction starts, the fluorescent dye and polymerization initiator are dissolved in liquid monomers. Since there is no liquid solvent added, the resulting fluorescent polymer is solid, transparent, dry, porogen-free and contains no liquid inside it. The dry environment inside the polymer helps stabilize the fluorescent dye, which is otherwise unstable in aqueous solution.

Example 2: Calibration of Read-Out Values of different Plate Readers

Step 1: Calibration of a Plate Reader with CRMs

A plate reader DigiPlex πCode Analyzer ("Master Plate Reader") is calibrated with a SRM 2944 according to instruction manual to obtain a certified value. Hereafter, any read-out value of the SRM 2944 by the master plate reader will be calibrated to the certified value. For example, if a value "200000 MFI" is obtained from the master plate reader calibrated with a SRM 2944, said value is used as a certified value. Any read-out value (such as 180000 MFI or 195000 MFI) in the master plate reader calibrated with the SRM 2944 will be deemed as the certified value "200000 MFI."

Step 2: Calibration of Plate Reader(s)

Step 2.1: The microplate comprising a fluorescent dye imbedded in the polymer on the surface of wells of the microplate was prepared according to Example 1. The microplate was placed in the calibrated DigiPlex πCode Analyzer according to Step 1 to obtain 8 read-out values as a set of original values, which were recorded in software. The software includes an applications or programs executing a linear regression anylasis.

Step 2.2: For the user's environment, the microplate of the invention was placed in a plate reader, and a set of current read-out values was obtained. The "current read-out values" and "original values" (which were already recorded in the software) were used for obtaining a formula Y=aX+b (a refers to a slope and b refers to an intercept) by the software conducting Weighted Least Squares (WLS) method. By using the formula, each current read-out value will be calibrated to a "calibrated value" as below, which will be close to the set of original values.

$$\text{calibrated value} = \frac{\text{current readout value} - b}{a}$$

Figure 2:
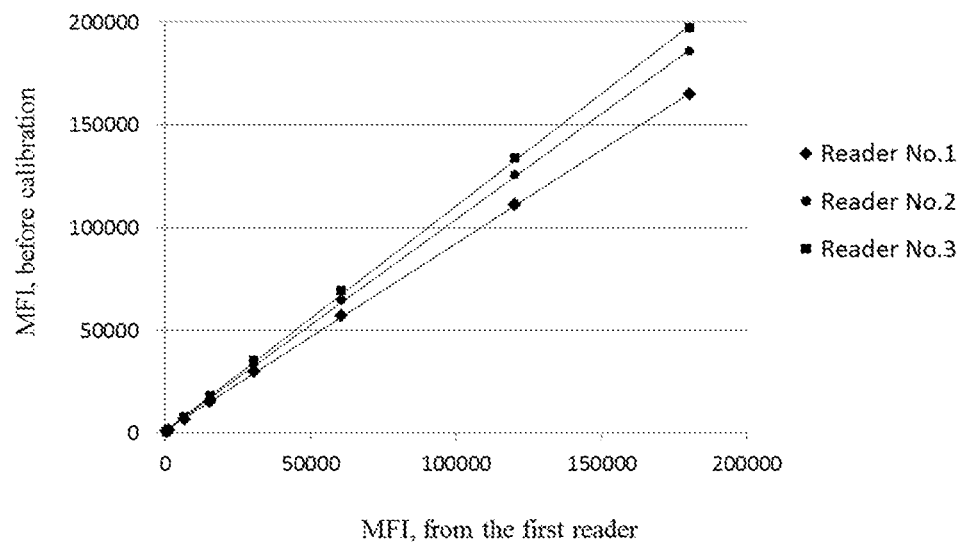
FIG. 2 shows three standard curves obtained in different plate readers (Plate Reader Nos: 1-3) without calibration.

To demonstrate the efficacy of the method for the calibration according to the present invention, three different plate readers (Nos.1 to 3) before calibration were shown in Table 1 and FIG. 2. Table 1 and FIG. 2 showed that, before the calibration, great CV percentages were obtained among three different plate readers.

TABLE 1

| Master Plate Reader | Plate Reader No. 1 | Plate Reader No. 2 | Plate Reader No. 3 | CV % |
|---|---|---|---|---|
| 180500 | 164843 | 185664 | 197120 | 8.96% |
| 120500 | 110933 | 125493 | 133589 | 9.31% |
| 60500 | 57131 | 64789 | 69035 | 9.48% |
| 30500 | 29675 | 33216 | 35349 | 8.75% |
| 15500 | 15767 | 16981 | 17920 | 7.37% |
| 6500 | 6976 | 7488 | 7893 | 6.17% |
| 1100 | 1557 | 1472 | 1408 | 5.05% |
| 500 | 960 | 704 | 640 | 22.05% |

Figure 3:
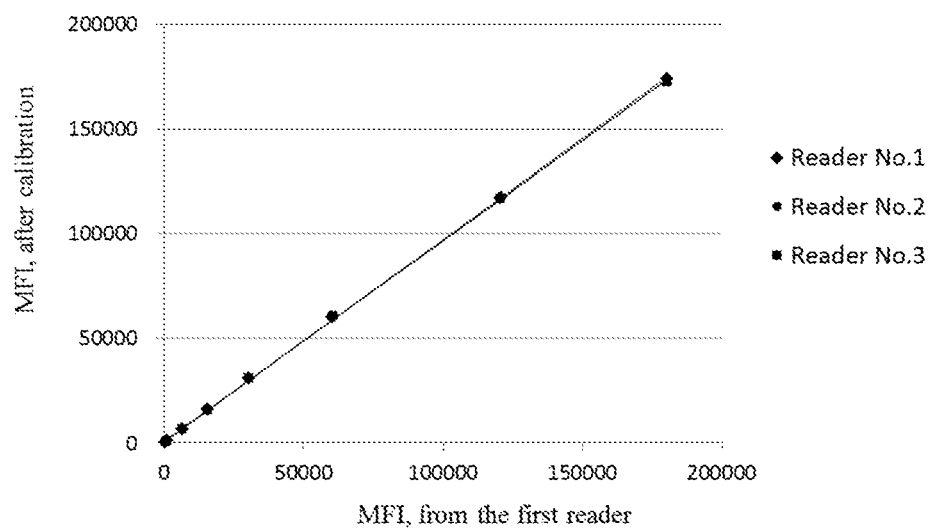
FIG. 3 shows three standard curves obtained in different plate readers with calibration according to the present invention.

Three different plate readers (Nos. 1 to 3) were then calibrated according to Steps 1 and 2 as stated above. The result was shown in Table 2 and FIG. 3. Table 2 and FIG. 3 showed that, CV percentages among three different plate readers were significantly reduced after the calibration.

TABLE 2

| Master Plate Reader | Plate Reader No. 1 | Plate Reader No. 2 | Plate Reader No. 3 | CV % |
|---|---|---|---|---|
| 180500 | 174139 | 172855 | 172460 | 0.51% |
| 120500 | 117015 | 116777 | 116853 | 0.10% |
| 60500 | 60005 | 60202 | 60350 | 0.29% |
| 30500 | 30912 | 30777 | 30866 | 0.22% |
| 15500 | 15857 | 15646 | 15610 | 0.85% |
| 6500 | 6860 | 6799 | 6834 | 0.45% |
| 1100 | 1118 | 1192 | 1158 | 3.21% |
| 500 | 485 | 476 | 486 | 1.11% |

Numerous modifications and variations of the invention as set forth in the above illustrative examples are expected to occur to those skilled in the art. Consequently, only such limitations as appear in the appended claims should be placed on the invention.

What is claimed is:

1. A method for providing a standard curve for quantifying a biomolecule, comprising:
   preparing a microplate comprising a fluorescent polymer casted on a plurality of wells of the microplate by the steps of:
   obtaining a Solution 1 by dissolving about 0.1 mg Nile Red in about 1 ml methyl methacrylate (MMA);
   obtaining a Solution 2 by dissolving 2,2'-Azobisisobutyronitrile (AIBN) in MMA;
   obtaining a plurality of Solutions 3 by performing a serial dilution of the Solution 1 with MMA;
   obtaining a plurality of Solutions 4 by adding the Solution 2 to each Solution 3 to a concentration of the solution 2 about 0.005%;
   adding about 50 µl of each Solution 4 to each of the plurality of wells of the microplate, wherein amounts of Nile Red imbedded in the fluorescent polymer and corresponding amounts of the fluorescent polymer in the plurality of wells of the microplate are present as a concentration gradient corresponding to the serial dilution of the Solution 1; and
   incubating the microplate at about 37°C for 24 hours;
   placing the microplate in a master plate reader;
   measuring a mean fluorescence intensity of each of the plurality of wells to obtain a set of original fluorescence intensity values; and
   determining a standard curve of best fit by plotting the set of original fluorescence intensity values against corresponding amounts of fluorescent polymer in the plurality of wells through linear regression analysis;
   wherein the fluorescent polymer is transparent, dry and solvent-free and porogen-free; and
   wherein the fluorescent polymer comprises a pre-determined amount of Nile Red imbedded in a polymer.

2. The method of claim 1, wherein the microplate has 6, 12, 24, 48, 96, 384 or more wells.

3. A method for calibrating read-out values of a user plate reader comprising:
   (i) preparing a microplate comprising a fluorescent polymer casted on a plurality of wells of the microplate by the steps of:
   obtaining a Solution 1 by dissolving about 0.1 mg Nile Red in about 1 ml methyl methacrylate (MMA);
   obtaining a Solution 2 by dissolving 2,2'-Azobisisobutyronitrile (AIBN) in MMA;
   obtaining a plurality of Solutions 3 by performing a serial dilution of the Solution 1 with MMA;
   obtaining a plurality of Solutions 4 by adding the Solution 2 to each Solution 3 to a concentration of the solution 2 about 0.005%;
   adding about 50 µl of each Solution 4 to each of the plurality of wells of the microplate, wherein amounts of Nile Red imbedded in the fluorescent polymer and corresponding amounts of the fluorescent polymer in the plurality of wells of the microplate are present as a concentration gradient corresponding to the serial dilution of the Solution 1; and
   incubating the microplate at about 37°C for 24 hours;
   (ii) placing the microplate in a master plate reader and measuring a mean fluorescence intensity of each of the plurality of wells to obtain a set of original fluorescence intensity values:
   (iii) placing the microplate in a user plate reader and measuring a mean fluorescence intensity of each of the plurality of wells to obtain a set of current fluorescence intensity read-out values;
   (iv) obtaining a formula of $Y=ax+b$ (where a refers to a slope and b refers to an intercept) based on the set of original fluorescence intensity values of Nile Red (X) and the set of current fluorescence intensity read-out values (Y) by conducting a Weighted Least Squares (WLS) method; and
   (v) obtaining a set of calibrated fluorescence intensity values from the set of current fluorescence intensity read-out values by subtracting b from each respective current fluorescence intensity read-out value and dividing by a to find each respective calibrated fluorescence intensity value;
   wherein the fluorescent polymer is transparent, dry and solvent-free and porogen-free;
   wherein the fluorescent polymer comprises a pre-determined amount of Nile Red imbedded in a polymer.

4. The method of claim 3, wherein the user plate is a microplate, optionally having 6, 12, 24, 48, 96, 384 or more wells.

5. The method of claim 1, wherein the biomolecule is a protein, nucleic acid, nucleotide, carbohydrate, or lipid isolated from a living organism.

* * * * *

UNITED STATES PATENT AND TRADEMARK OFFICE
CERTIFICATE OF CORRECTION

PATENT NO. : 12,099,011 B2
APPLICATION NO. : 17/083182
DATED : September 24, 2024
INVENTOR(S) : Cheng-Tse Lin et al.

Page 1 of 1

It is certified that error appears in the above-identified patent and that said Letters Patent is hereby corrected as shown below:

On the Title Page

Inventor's address should be listed as the followings:
(72) Inventors: Cheng-Tse Lin, Taipei (TW); Yi-Ming Sun, Taipei (TW); Kuei-Shen Hsu, Taipei (TW); Liang-Han Chang, Taipei (TW); Yao-Kuang Chung, Taipei (TW); Chin-Yun Wu, Taipei (TW); Chin-Shiou Huang, Taipei (TW)

Signed and Sealed this
Third Day of June, 2025

Coke Morgan Stewart
*Acting Director of the United States Patent and Trademark Office*